United States Patent
Lyle et al.

(10) Patent No.: US 12,380,190 B1
(45) Date of Patent: Aug. 5, 2025

(54) REFLEXIVE RESPONSE-BASED VIDEO AUTHENTICATION METHOD AND SYSTEM

(71) Applicant: UIPCO, LLC, San Antonio, TX (US)

(72) Inventors: Ruthie D. Lyle, Durham, NC (US); Snehal Desai, Richardson, TX (US); David Joaquin Harris, San Antonio, TX (US); Eric David Schroeder, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 353 days.

(21) Appl. No.: 17/823,562

(22) Filed: Aug. 31, 2022

Related U.S. Application Data

(60) Provisional application No. 63/239,084, filed on Aug. 31, 2021.

(51) Int. Cl.
*G06F 21/32* (2013.01)
*G06V 40/18* (2022.01)
*G06V 40/40* (2022.01)

(52) U.S. Cl.
CPC ............ *G06F 21/32* (2013.01); *G06V 40/197* (2022.01); *G06V 40/40* (2022.01)

(58) Field of Classification Search
CPC ....... G06F 21/32; G06V 40/197; G06V 40/40
See application file for complete search history.

(56) References Cited

U.S. PATENT DOCUMENTS

| | | | |
|---|---|---|---|
| 7,336,174 B1* | 2/2008 | Maloney | B25H 3/00 340/568.1 |
| 10,019,133 B1* | 7/2018 | McNeill | H04L 51/56 |
| 11,294,459 B1* | 4/2022 | Richman | G06V 40/197 |
| 12,099,586 B2* | 9/2024 | Paul | G06F 21/32 |

(Continued)

FOREIGN PATENT DOCUMENTS

| | | | | |
|---|---|---|---|---|
| WO | WO-2014184436 A1 * | 11/2014 | | G06F 21/32 |
| WO | WO-2022066817 A1 * | 3/2022 | | G06F 21/32 |

OTHER PUBLICATIONS

J. Booth, A. Roussos, S. Zafeiriou, A. Ponniah and D. Dunaway, "A 3D Morphable Model Learnt from 10,000 Faces," 2016 IEEE Conference on Computer Vision and Pattern Recognition (CVPR), Las Vegas, NV, USA, 2016, pp. 5543-5552, doi: 10.1109/CVPR.2016.598. (Year: 2016).*

(Continued)

*Primary Examiner* — Oleg Korsak
(74) *Attorney, Agent, or Firm* — Plumsea Law Group, LLC

(57) ABSTRACT

A remote signal-based method and system of performing an authentication of video of a person in order to authorize access to a secured resource. The system and method are configured to cause a visual and/or audio pattern to be displayed in a remote computing device while collecting image data from the same device. The image data is evaluated to determine whether the appropriate response from the person is present. If the response is present, the system determines the image is authentic and can verify an identity of the person, and can further be configured to automatically grant the person access to one or more services, features, or information for which he or she is authorized.

20 Claims, 8 Drawing Sheets

(56) References Cited

U.S. PATENT DOCUMENTS

| | | | |
|---|---|---|---|
| 2014/0331315 A1* | 11/2014 | Birk | G06F 21/36 |
| | | | 726/19 |
| 2016/0188958 A1* | 6/2016 | Martin | G06V 40/161 |
| | | | 382/118 |
| 2019/0020554 A1* | 1/2019 | Lilienthal | H04L 41/22 |
| 2020/0097643 A1* | 3/2020 | Uzun | G06V 40/40 |
| 2021/0097260 A1* | 4/2021 | Verma | G06V 10/449 |
| 2024/0070251 A1* | 2/2024 | Maizels | G06F 40/40 |

OTHER PUBLICATIONS

Sluganovic, Ivo and Roeschlin, Marc and Rasmussen, Kasper B. and Martinovic, Ivan, "Using Reflexive Eye Movements for Fast Challenge-Response Authentication," 2016, Association for Computing Machinery, New York, NY, USA, pp. 1056-1067, doi: 10.1145/2976749.2978311. (Year: 2016).*

Usman Saeed, "Eye movements during scene understanding for biometric identification," Pattern Recognition Letters, vol. 82, Part 2, ISSN 0167-8655, https://www.sciencedirect.com/science/article/pii/S0167865515001919 (Year: 2016).*

Meng Shen and Zelin Liao and Liehuang Zhu and Rashid Mijumbi and Xiaojiang Du and Jiankun Hu, "IriTrack: Liveness Detection Using Irises Tracking for Preventing Face Spoofing Attacks," 2018, https://arxiv.org/abs/1810.03323 (Year: 2018).*

* cited by examiner

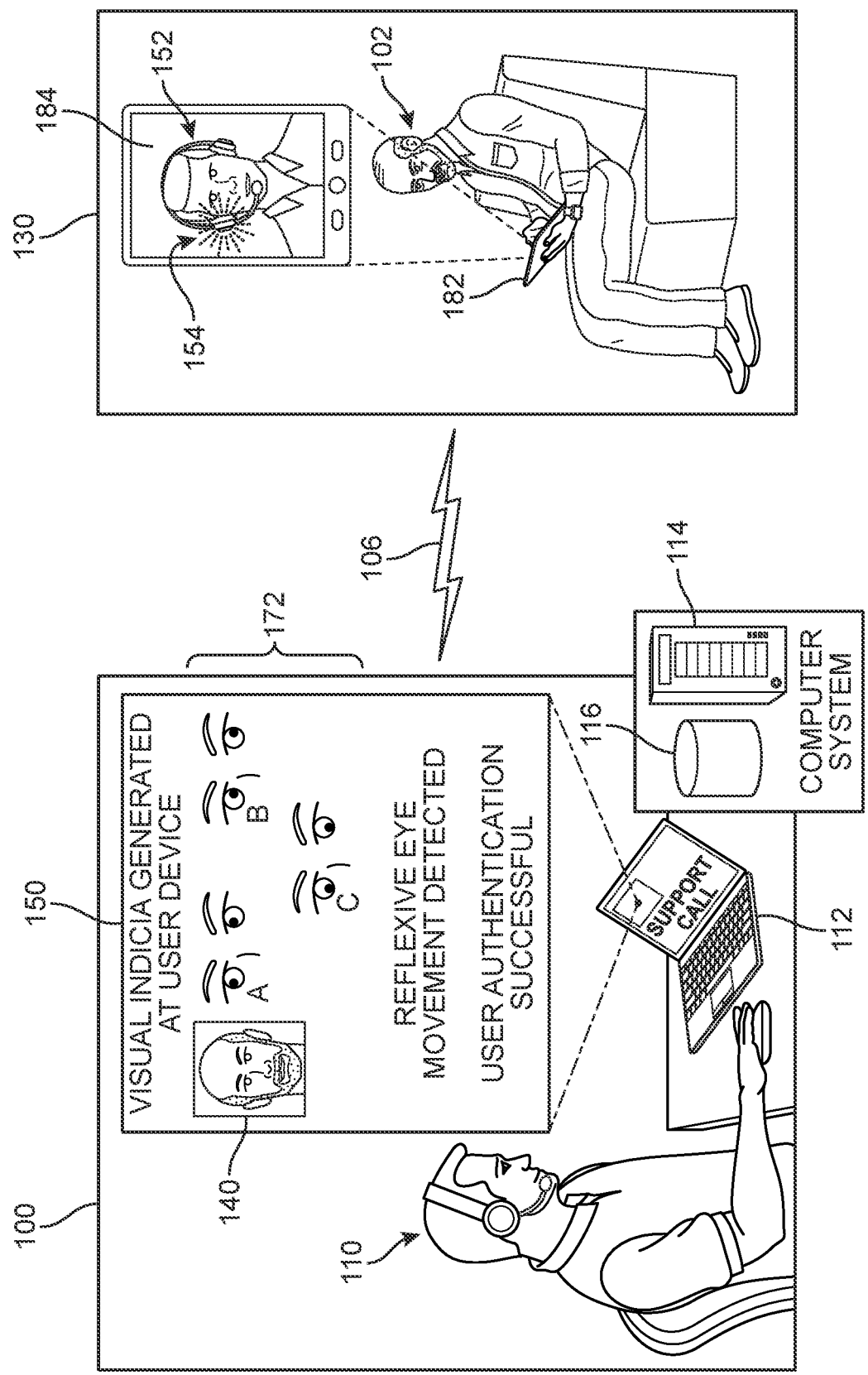

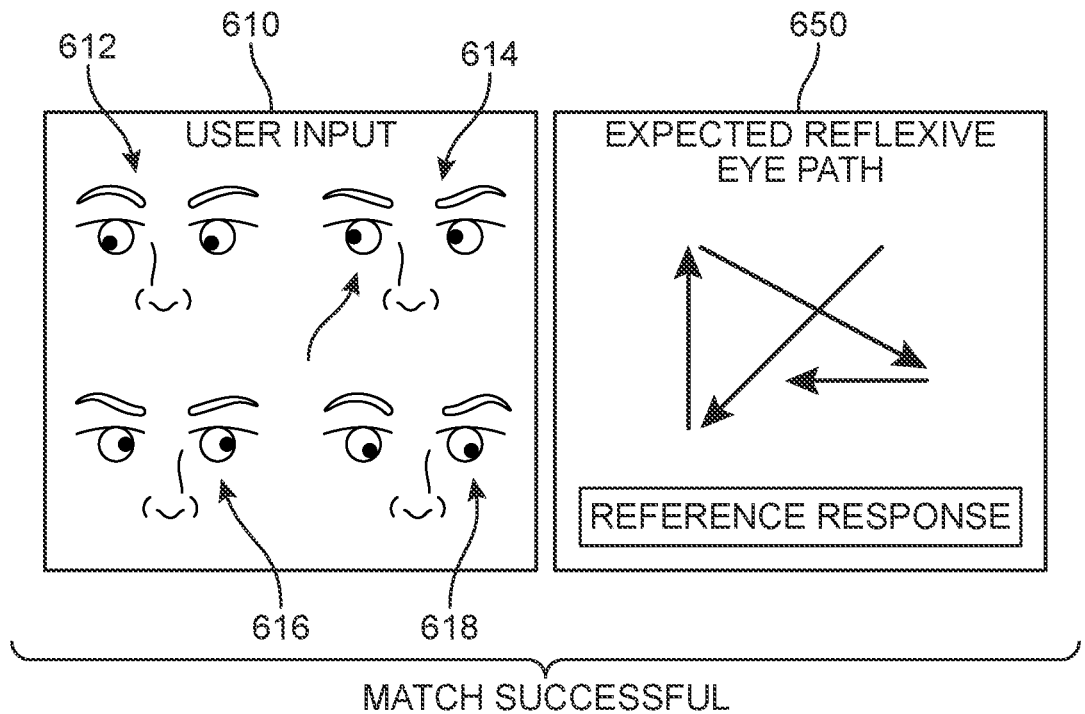
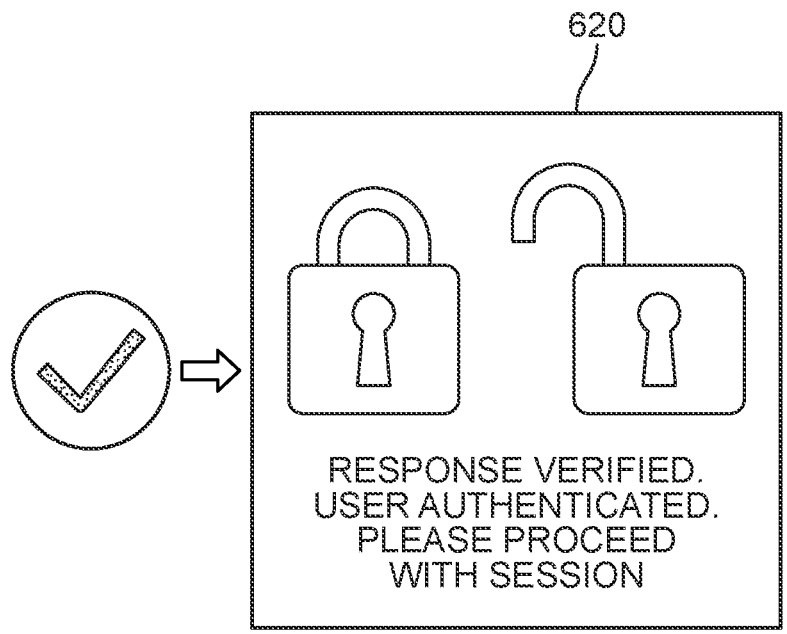
FIG. 6

REFLEXIVE RESPONSE-BASED VIDEO AUTHENTICATION METHOD AND SYSTEM

CROSS-REFERENCE TO RELATED APPLICATION

This application claims the benefit of U.S. Provisional Patent Application Ser. No. 63/239,084 filed on Aug. 31, 2021 and titled "Reflexive Response-Based Video Authentication Method and System", the disclosure of which is incorporated by reference in its entirety.

TECHNICAL FIELD

The present disclosure generally relates to identity authentication, and specifically to a method and system for authentication of videos of persons seeking access to one or more secured services, features, and resources. The authentication is based on generation of visual indicia or audio via a user device and a synchronized capture of image and/or audio data by the same computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of images in order to protect user resources. The method includes a first step of receiving, at a cloud-based authentication system and from a first computing device, a request to access a secured resource of a first user. The method also includes a second step of accessing, in response to the request, a first visual pattern from a pattern repository of the authentication system, the first visual pattern being associated with a first reflexive response pattern that should be elicited on a person's face when the person views a rendering of the first visual pattern on a display. A third step includes transmitting, from the authentication system and in response to the request, a first control signal to the first computing device, the first control signal including the first visual pattern. In addition, the method includes a fourth step of obtaining, at the authentication system, first image data captured by a camera of the first computing device while presentation of the first visual pattern via the first computing device was to have occurred, the first image data including a video recording of a face of a person. A fifth step includes determining, at the authentication system, that the first image data includes a second reflexive response pattern that is sufficiently similar to the first reflexive response pattern so as to be classified as a match. In addition, a sixth step includes verifying, in response to the patterns matching, an authenticity of the video, and a seventh step involves granting the first user access to the secured resource for which the first user is authorized.

In another aspect, a method for detecting fraudulent attempts to obtain access to secure user data using image data is disclosed. The method includes a first step of receiving, at a cloud-based authentication system and from a first computing device, a request to access a secured resource of a first user, and a second step of accessing, in response to the request, a first visual pattern from a pattern repository of the authentication system, the first visual pattern being associated with a first reflexive response pattern that should be elicited on a person's face when the person views a rendering of the first visual pattern on a display. A third step includes transmitting, from the authentication system and in response to the request, a first control signal to the first computing device, the first control signal including the first visual pattern, and a fourth step includes obtaining, at the authentication system, first image data captured by a camera of the first computing device while presentation of the first visual pattern via the first computing device was to have occurred, the first image data including a video recording of a face of a person. In addition, a fifth step includes determining, at the authentication system, that the first image data fails to include a second reflexive response pattern that matches the first reflexive response pattern, a sixth step includes determining, in response to the first image data failing to include a matching pattern, that there is a high likelihood of the request originating from a fraudulent source, and a seventh step includes denying the request and blocking access to the secured resource.

In another aspect, a system for verifying an authenticity of images in order to protect user resources includes a processor and machine-readable media. The machine-readable media include instructions which, when executed by the processor, cause the processor to receive, at a cloud-based authentication system and from a first computing device, a request to access a secured resource of a first user, and access, in response to the request, a first visual pattern from a pattern repository of the authentication system, the first visual pattern being associated with a first reflexive response pattern that should be elicited on a person's face when the person views a rendering of the first visual pattern on a display. The instructions further cause the processor to transmit, from the authentication system and in response to the request, a first control signal to the first computing device, the first control signal including the first visual pattern, and obtain, at the authentication system, first image data captured by a camera of the first computing device while presentation of the first visual pattern via the first computing device was to have occurred, the first image data including a video recording of a face of a person. In addition, the instructions cause the processor to determine, at the authentication system, that the first image data includes a second reflexive response pattern that is sufficiently similar to the first reflexive response pattern so as to be classified as a match, verify, in response to the patterns matching, an authenticity of the video, and grant the first user access to the secured resource for which the first user is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is an overview of a scenario in which a person provides image data during a remote signaling event in order to obtain access to a secured resource, according to an embodiment;

FIG. 6 depicts an example of a system determination that the image data includes the correct reflexive response, resulting in the system granting access to the secured resource, according to an embodiment.

DETAILED DESCRIPTION

Figure 2A:
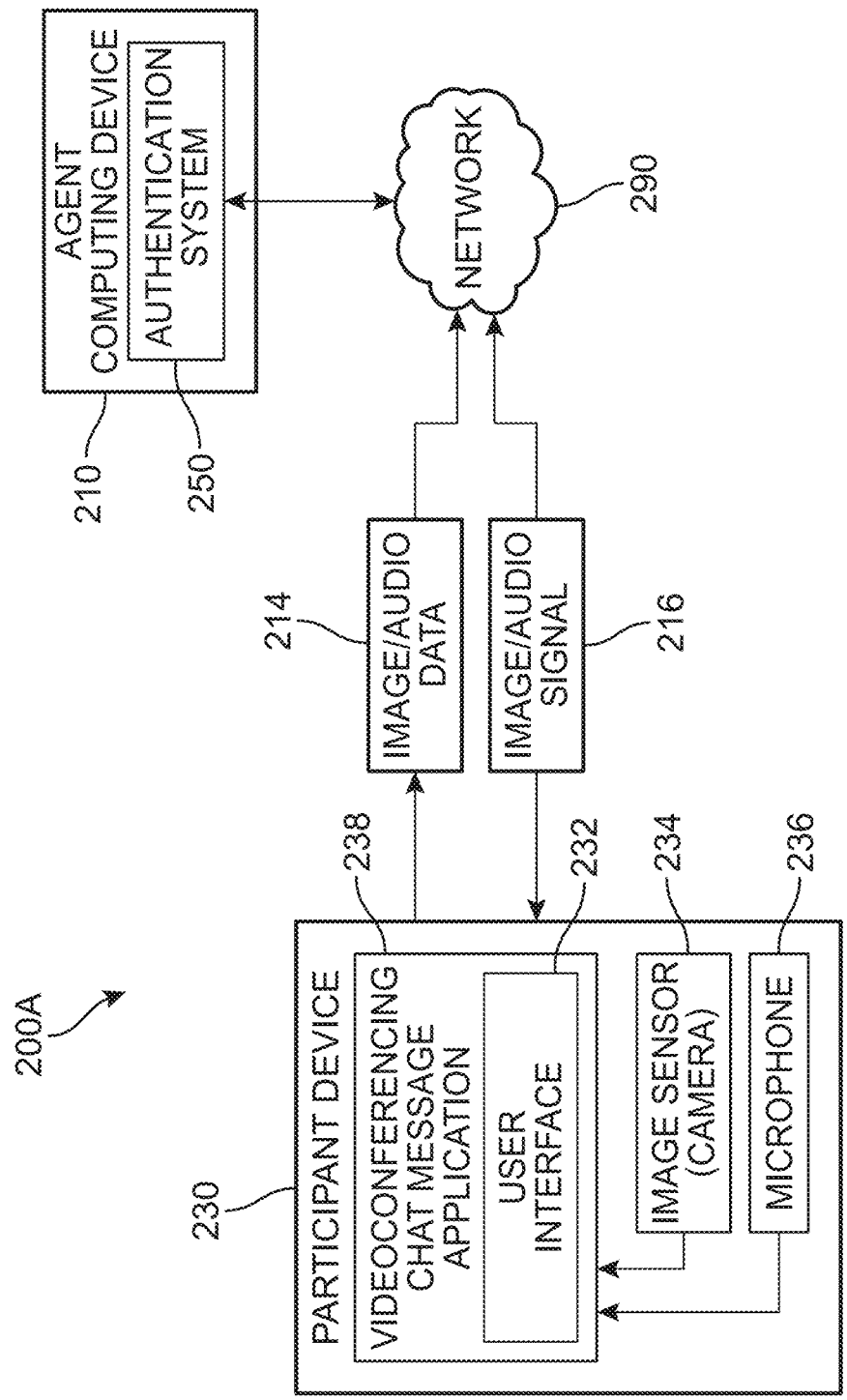
FIGS. 2A and 2B are an overview of an environment of a remote generation of visual indicia and/or audio directed toward eliciting a response from a user, according to an embodiment.

The embodiments provide a method and system of authenticating user videos and other streaming image data in a more secure and more efficient manner by remotely triggering visual indicia on a display at the user device to elicit reflexive feedback from the user. As described in greater detail below, an authentication process and system based on reflexive response on a known user device may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image sensors with computing devices in the day-to-day life of the modern consumer.

More specifically, the system contemplates the use of a remote signal to cause a user computing device to briefly display visual indicia while image data of the user's face is recorded. This can occur, for example, during a video session with a customer representative. In some cases, the representative may manually initiate the transmission of the remote-control signal. In other cases, the system could be configured to monitor the position and orientation of the user's face in the video feed. When their face is in an appropriate position and orientation, the system could send a signal to have the screen flash, or otherwise display some type of visual output. The user's face—in particular, their eyes—should be drawn to this visual presentation in a way that corresponds to how most persons would instinctively or naturally respond to such a display. This response could be automatically detected within the video. For example, in some embodiments, during a video session with an agent the system could generate dots or other visual indicia on a user's video screen. The parameters of the indicia (e.g., size, shape, location, time displayed, etc.) would be selected so that the user would instinctively glance at the indicia momentarily. This reflexive movement of the member's eyes (from one part of the screen to another) could then be detected by the authentication system to indicate that this is not a faked video. In another embodiment, the user could be asked to follow the indicia with their eyes. In still another embodiment, audible noises could be generated at different speakers on the device, and the user could be asked to indicate whether each sound was generated from the left or right speaker.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter's fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement—relying on a change in expression of the user or indicating which speaker produced a sound—precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any email system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serves as a barrier to deep fake imposter attacks.

For purposes of introduction, an overview of one embodiment of the proposed systems and methods is illustrated with reference to FIG. 1. In FIG. 1, an example of an authentication process is shown in which a first user 102, in a first location 130, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a user computing device ("user device") 182 through which the communication session occurs. The user device can include a tablet, a laptop, a smartphone, a desktop computer, a smart device, or similar kind of device that allows first user 102 to contact call center 100. For example, the first user 102 can be speaking and listening to the representative 110 via a desktop computer. For purposes of this example, the first user 102 has just been connected to representative 110 and is seeking access to their account details via a tablet device.

In different embodiments, the user device 182 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The user device 182 may be configured to receive and analyze data from various input sensors associated the device or data that is communicated from external components or devices to the device. In some cases, the user device 182 may also include a navigation system equipped with a GPS receiver that can receive GPS information or other receivers capable of receiving global or local positioning information.

A communication module may allow the user device 182 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 182 may include a device display ("display") 184 that can, for example, present information and various media for a product/service support software application ("app"). In some embodiments, the app is associated with the provider of the product/service for which the service representative is offering support. In some embodiments, the first user 102 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the user device 182. In some embodiments, the user interface can include a messaging window or other chat-space by which the service representative may send messages or other digital content. Alternatively, in some embodiments, the first user 102 can also speak with the service representative via a voice calling application on user device 182, or directly through a telephone or other external device.

In an example embodiment, customer service call center 100 includes at least one computer system 114. The term "computer system" refers to the computing resources of a single computer, the partial computing resources of a single computer, a plurality of computers communicating with one another, or a network of remote servers. In one embodiment, computer system 114 includes at least one server having at least one processor.

In different embodiments, computer system 114 includes one or more computing devices (for example, a server) that may be in communication with one or more databases 116. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, computer system 114 may also include or be configured with access to an authorization system (see FIGS. 2A and 2B), of which a reflexive response verification module ("verification module") is a component. In some embodiments, the verification module may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

As shown in FIG. 1, representative 110 has access to a device 112 connected to computer system, which may be mobile computing device, such as a smartphone or tablet computer, a desktop computer, a laptop computer or any other kind of computing device. Using device 112, representative 110 may be able to review customer records, send documents and forms to a customer, provide access to a secured resource, and/or perform other tasks required to help a customer calling in to call center 100.

In some embodiments, both device 112 and user device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 182 could operate in a client-server relationship with one or more servers of computer system 114. For example, computer system 114 may include a server that communicates with user device 182 as well as other remote devices (e.g., user devices of other customers) over a network 106. The user device 182 may provide the front-end of a system that provides users with options for performing various kinds of tasks (for example, making fund transfers when the company is a bank). In some cases, user device 182 may run client software ("app") 152 through a web browser, in which case the client software may be hosted on a server associated with computer system 114. In other cases, user device 182 may run client software in the form of a native software application that has been downloaded through a centralized marketplace (i.e., an "app store"). In some cases, while the client software that allows users to perform various tasks may be run on the user device 182, the data may be retrieved from and stored on databases associated with computer system 112 (e.g., databases 116).

During the call between representative 110 and first user 102, the first user 102 requests access to an account or other secured resource of the first user. In response, in different embodiments, the remote access management system can automatically, or at the manual request of the service representative, initiate an authentication procedure, action, or task that includes a remote signaling event. As a general matter, a remote signaling event refers to the process and period during which the authentication system issues a control signal to a remote user device over a network, and the control signal causes the user device to present or produce an output, either via a device display or a speakers connected to device.

In different embodiments, the access management system can then generate one or more signals that are transmitted over network 106. The signals can, for example, include a specific visual signal, as well as a request to the user device 182 to display the visual signal at a specific time. The signal is received by the user device 182 that is known to be associated with the first user (e.g., based on a previous device registration session) as a control signal that causes the user device 182 to produce a particular output. In FIG. 1, in response to the signal, the user device 182 produces an image or sequence of images ("pattern") 154 on its display 184 that corresponds to a pattern of visual icons or other graphics rendered based on the data transmitted by the verification module. Some non-limiting examples of such patterns include a sequence of flashes occurring within a few seconds, with the duration of each flash and time between flashes comprising the pattern, and/or a sequence of flashes of various colors, with each flash appearing for less than 5 seconds, and typically for less than 1-2 seconds, a specific graphic or animation, a number or other alphanumerical message, a sequence of images or indicia that are animated, one or more icons that appear to move across the screen, etc. Similarly, in embodiments in which the authentication is sound-based, audio (sound) patterns can include a sequence of sounds occurring within a few seconds, with the duration of each sound, type of sound, changing the directionality of the audio playback (from the left or right speaker) and time between sounds comprising the pattern, and/or a sequence of changes in intensity of the sounds, etc.

At or around the same time, in a different but synchronized remote signaling event, the verification module also generates a control signal that requests or triggers a capture of a sample of image data 140 by a camera of (or connected to) the user device 182. In some embodiments, the image data 140 is a segment taken from a video stream received during the communications session. This captured image data 140 can include an image of the face of the user. The captured image data 140 is then sent to and received by the remote access management system via network 106.

Based on the received image data 140, the system will determine whether to authenticate the user for access to the secured resource. For example, verification module 150 can process and analyze image data 140 and determine whether the image data 140 includes a change in expression of the user that corresponds to the expected reference pattern that should be elicited when the pattern 154 was displayed. If the expected reflexive response 172 is detected in the image data 140, the authenticity of the video or image can be verified, providing an additional layer of veracity to the user's identity. In this example, image data 140 does include the correct facial response (corresponding here to an eye movement sequence A→B→C), and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the image data capture of the visual or haptic pattern.

Figure 2B:
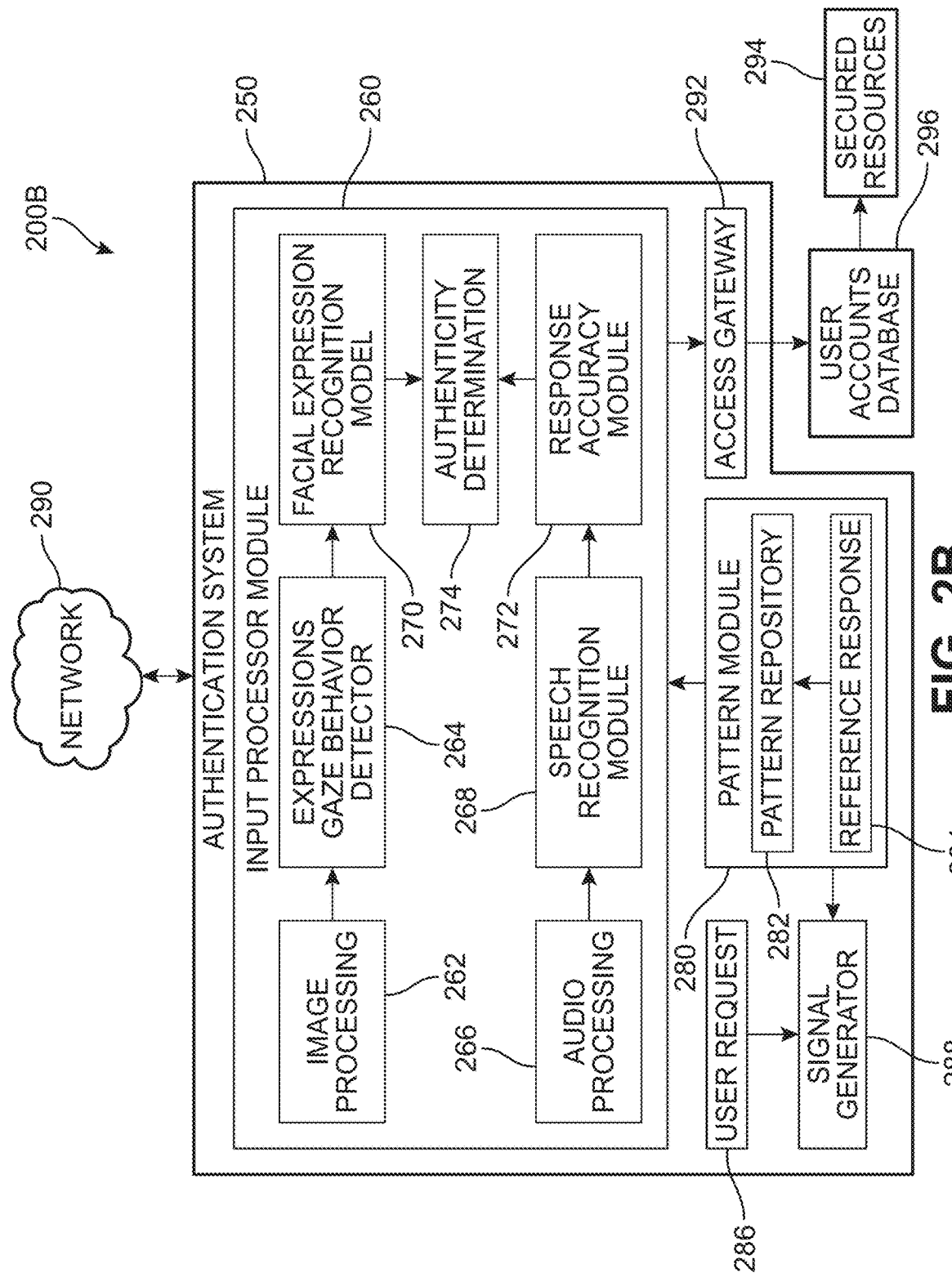

In order to provide the reader with a greater appreciation of the embodiments, FIGS. 2A and 2B depict an overview of an embodiment of an environment 200A and 200B of an access management system architecture in which user image and/or audio data is captured and used to determine an authenticity of the video. The two figures are separated for purposes of clarity, such that the two drawings represent a single diagram. It should be understood that the environment (200A, 200B), collectively referred to as environment 200, is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A and 2B.

As shown in FIG. 2A, the environment 200 includes a participant computing device ("participant device") 230 that is configured to communicate with an agent computing device ("agent device") 210, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application ("app") 238 that can connect the participant with the support agent. For example, a customer can receive and send information through a user interface 232 for app 238 that may be presented on the device display. Although the app 238 is shown as residing on participant device 230 in FIG. 2A, it should be understood that the app 238 can be a web-based application that is accessed from the device via network 290.

The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate a screen sharing function, whereby content currently being displayed on the participant device 230 is transmitted to the agent computing device 210. In some embodiments, the user interface 216 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Thus, as a general matter, agent device 210, participant device 230, and the authorization system (see FIG. 2B) can be configured to work in conjunction with the telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™) internet based meetings (e.g., WebEx™), custom call-center systems, and other conference call systems. In addition, application can be configured to present various interfaces by which administrator or other users can interact with features of the system 250 (see FIG. 2B). In addition, the app 238 running on participant device 240 can include additional components enabling features by which control signals received from the authorization system may be executed. In other embodiments, the components can be configured as a simple software execution mechanism which receives, translates, and presents output in response to signals transmitted by the authorization system.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

During the communication session between the participant and the agent, control signals may be transmitted from the authorization system that cause a camera 234 and/or microphone 236 of the participant device 230 to capture image and/or audio data 214 from the participant. The data capture is configured to coincide with the presentation of an image and/or audio from the participant device display and/or speakers in response to an image/audio control signal 216 generated by the authorization system.

Referring to FIG. 2B, in different embodiments, an authentication system ("system") 250 is configured to receive a user request 286 for access to a secured resource 294 associated with a user account in user account database 296. A signal generator module 288, in communication with a pattern module 280, obtains the selected or designated pattern that will be transmitted to the participant device for presentation to the participant. In different embodiments, the patterns, whether audio and/or visual, are stored in and access from a pattern repository 282, along with a reference response database 284 that includes the reference responses that would correspond to a 'correct' or expected response from the user. The signal generator module 288 produces control signal 216 (see FIG. 2A) that will cause the participant device 230 to present the selected pattern.

In different embodiments, the system 250, agent device, and/or participant device may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In some embodiments, the system 250 is capable of communicating with external devices such as agent device (also referred to herein as an administrator computer) and the participant device through the network 290 using wired or wireless communication capabilities. The system 250 can be understood to comprise a cloud-based server and, along with the agent device, may include computing devices comprising any number of components, such as a Network Interface Card (NIC), allowing the respective devices to receive, transmit, process, and store information obtained from the image capture devices. In other words, the system 250 may include groups or subgroups of computing devices that can communicate with each other, but not necessarily with the computing devices in other groups or subgroups. The system 250 may include computing devices of disparate types, having different types of hardware and software configurations and in a variety of different locations. In some cases, multiple devices or subsystems can be identified together as a single computing device.

In different embodiments, the system 250 includes or is configured to access one or more databases, such as member profile or a user accounts database 296, and enable access to secured resources 294. The user accounts database 296 is a content library that stores account data related to one or more users. The data may include, for a plurality of users, name, personal and professional details, current and past policy for the user, credit limit of users, among other details. The database 296 can further include connection information for known (registered) user devices for which the user has authorized and enabled the input and execution of a control signal. In one embodiment, the registry maintains a listing of one or more computing devices for each end-user subscribed to the control signal-based authentication feature. In different embodiments, the database 296 therefore includes a protocol providing communication with the app running on the user's devices. It can be understood that the end-user has also provided consent to the system for remote access and control of each of these registered devices as appropriate for authentication purposes.

In some embodiments, the participant device includes a GPS receiver that can receive GPS information or other receivers capable of receiving global or local positioning information. The system can be configured to evaluate the user location information and determine which device can serve as target devices for the control signal(s). Once the signal generator module 288 identifies a device associated with the purported user, it may select (i.e., at random or following a particular order) a signal pattern for authentication by reference to the pattern repository 282. The pattern repository 282 includes one or more visual and/or audio signals that may be used for verification purposes. These signals may be a few milliseconds to a few seconds in duration. In some embodiments, the signals are configured to cause to be presented a visual pattern on a device display, while in other embodiments, the signals are configured to cause speakers for the participant device to playback sounds on either or both of the left and right speaker.

In different embodiments, the system can include provisions to ensure or otherwise facilitate the capture of output from the participant in response to the presentation of a pattern. In one embodiment, the agent, via agent device, can request (via message or voice) that the user move their face more clearly or fully into the field of view of the camera. In another embodiment, the system can be configured to automatically detect the presence of the user's face during a video session with the user. In one example, the participant's face may be out of range of a field of view of the camera, and the system can automatically present a request to the user to move into the field of view of the camera. In one embodiment, the system will show the user, on a display for the participant device, the image data being recorded so that the user can move to accommodate the view of the camera.

Referring to both FIGS. 2A and 2B, once a pattern has been obtained from pattern module 280, the signal generator module 288 is configured to issue the image/audio control signal 216 to participant device 230. The signal can include information enabling the system to connect to the participant device 230, as well as provide the selected audio and/or visual signal to the device over network 290. Thus, when a user requests access to a secured resource, for example via a user interface presented on participant device 230 over network 290, the control signal 216 may be generated by system 250, causing a display (in cases of a visual pattern) and/or playback (in cases of an audio pattern) of the signal.

Furthermore, in some embodiments, system 250 is configured to cause participant device 230 to send image/audio data 214 to remote components such as the system 250 and/or the agent device 210. Thus, in embodiments in which the pattern is visual, a camera control signal is configured to cause the camera 234 of participant device 230 to record images during a period of time overlapping with the scheduled output of the pattern from the display of the same device. This ensures that the image data is collected when the visual pattern is presented by the display for participant device 230. Similarly, in embodiments in which the pattern is auditory, a microphone control signal is configured to cause the microphone 236 to record audio during a period of time overlapping with the scheduled output of the pattern from speakers of the same device. In one embodiment, the transmission of the visual or audio control signal 216 to the participant device 230 occurs at the same time or otherwise close in time as a transmission of either or both of a camera control signal or speaker control signal from the system 250 to the participant device 230.

In some embodiments, image data can be received by and processed via an image processing module 262 and/or the audio data can be received by and processed via an audio processing module 266. In different embodiments, only one of the two data types may be collected and used by an authenticity determination module 274, while in other embodiments, both types of data will be used. In embodiments capturing image data, image signal processing algorithms and/or software (e.g., image processing module 262) can perform pre-processing and processing of the captured image data. For example, the image input can be cleansed and normalized by the image processing module 262. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. In another embodiment, one or more of the operations of image processing module 262 can be performed by image processing components of the participant device 230 before the image data is sent to the system 250.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Once the data has been processed, relevant features may be extracted for use as input by an expression/gaze detector model 264, such as micro-expression or macro-expression facial behavior. As a general matter, facial micro-expressions are rapid involuntary facial expressions which reveal suppressed affect. Micro-expressions are typically very rapid (⅓ to 1/25 second; the precise length definition varies) involuntary facial expressions which are instinctual and generally cannot be faked.

The model 264 receives the processed image data. A wide range of algorithms for interpreting emotion from facial-based data are available. For example, model 264 may use facial geometric features, appearance-based facial features, and a combination of these two features to perform facial and gaze recognition and detection. In some cases, the model can divide the face into many small-size grids, and the features from all these grids are concatenated to identify the facial expressions. Region of Interest (ROI) features from facial images and thermal images may also be used for detecting emotions, or other available gaze detection software.

In one embodiment, the system 250 is configured to compare the detected reflexive response against the reference response (i.e., the response that should occur when a user sees the presented visual pattern) via a facial expression recognition module 270. If the responses match within certain parameters, the user is deemed to pass the authentication or verification test, indicating with a high likelihood that the user is indeed the account holder or other authorized person. In some embodiments, the image data is processed and models or representations of the image are built. These models are compared against one another. In different embodiments, one or both samples may be deemed unacceptable or unusable if the image is too bright or too dark, or if there is too much noise (poor signal to noise ratio). If a sample is not acceptable the system may request an additional or further sample and again trigger generation of visual indicia from the participant device 230 (either the same signal or a different/new signal).

If the image data is acceptable or sufficient, a scoring occurs via the facial expression recognition module 270. The scoring process is analogous to "what is the probability that the response captured by the camera is the same as the verification reference sample that is stored in the reference response database for each signal?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by an authenticity determination module 274. If the score is determined to represent a successful match, the system 250 and/or agent may allow a user to proceed further within a call center or telephone banking menu system or other secured resource 294 being safeguarded by the service provider.

Thus, the data samples are compared by the facial expression recognition module 270, and if a match is found or is in an acceptable range, the access to secured resource(s) 294 by the user will be allowed and/or enabled by access gateway 292. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the user's account address or other communication channel on record in user accounts database 296 for the registered user.

As noted above, in different embodiments, the participant device 230 includes microphone 236 that is linked to or otherwise integrated within a unit configured to capturing sounds in the participant's physical environment. When a user requests access to a secured resource, for example via a user interface of app 238, the system 250 can be configured to select an audio signal from the pattern repository 282. This audio control signal is sent to the participant device 230 and causes playback at the participant device 230. In some embodiments, the control signal causes playback to be associated with a directionality characteristic. In other words, the audio can be played such that the sound is only produced from a left speaker or only from a right speaker. In another example, the sound may only be produced from a left speaker, and then only from a right speaker, and continue in a pattern of left or right. The participant is then requested to indicate, either verbally or via a message entered into a chat for app 238, from which speaker the sound was produced, or what the directionality sequence was for the audio playback.

In different embodiments, in cases of a verbal response by the participant, various audio signal processing algorithms and/or software (e.g., audio processing module 266) be processed either at the participant device 230 and/or via audio processing module 266 in order to extract user's speech, which is then provided to a speech recognition module 268, which will identify the words spoken by the participant. If the verbal response (or message) includes the correct answer, as determined by a response accuracy module 272 (which is in communication with the reference response module 284), the user is deemed to pass the authentication or verification test, indicating that the video is authentic.

It can be appreciated that authentication based on verification of the user's response to a visual or audio signal at the known user device strongly implies that the user's identity is true and correspondingly is in fact entitled to whatever access is being requested. It should be understood that while the system 250 bases access decisions at least in part on the detection of the appropriate response from the user, the system is in some embodiments further configured to first confirm that the user ID and optional password match based on information available in the user accounts database 296.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agents or service representatives can refer to any person or personnel who offers the caller (or person who was called) assistance, and has access to the system 250 during the communication session with the customer.

Figure 3:
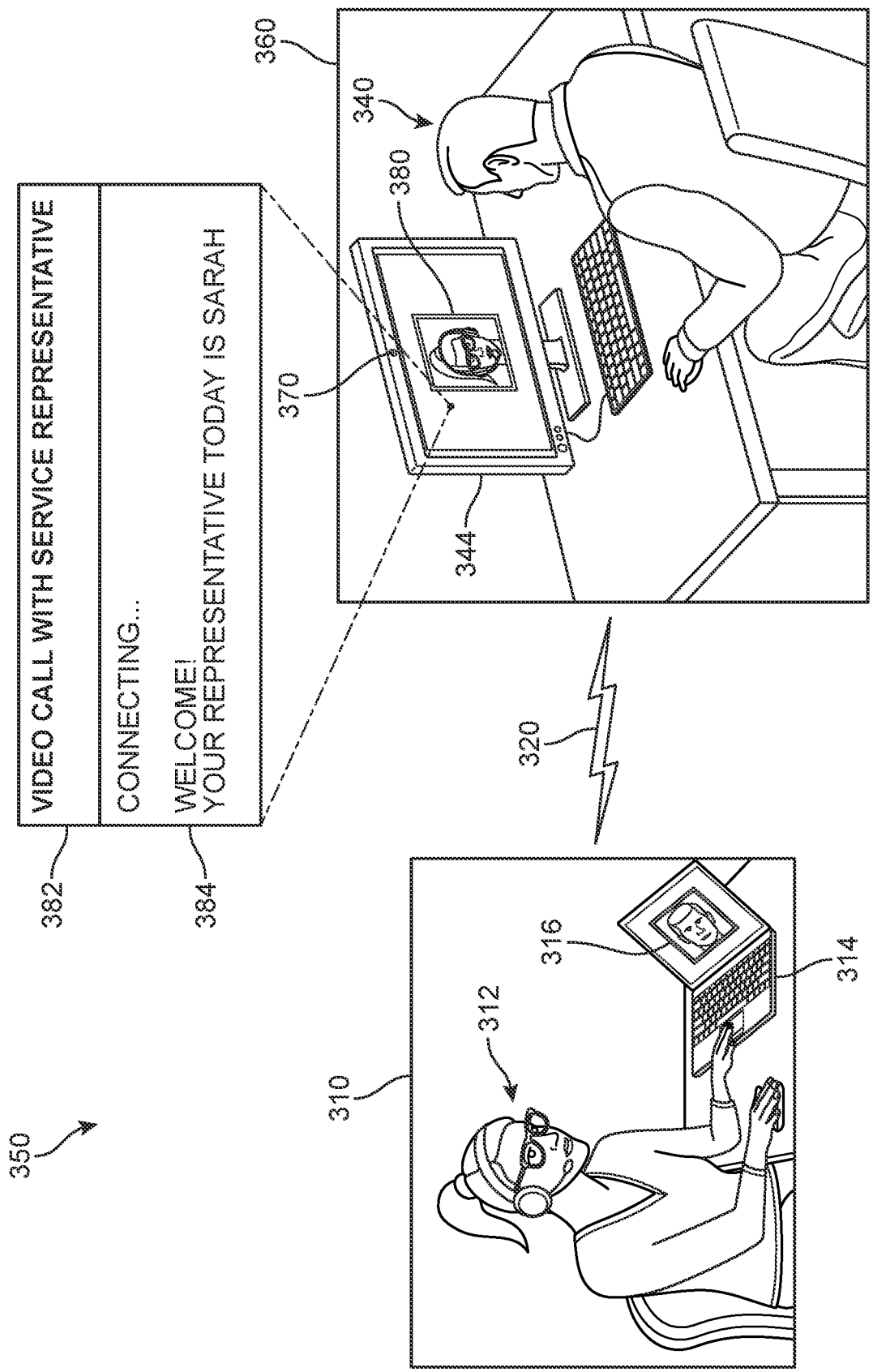
FIGS. 3 and 4 depict an example of a user requesting access to a secured resource and the authentication system initiating a remote authentication event, according to an embodiment.

Referring now to FIGS. 3-6, an example of an authentication scenario occurring during a communication session 350 between a second user 340 and an agent 312 is depicted. In FIG. 3, the second user 340 is, via a first computing device ("first device") 344 at a remote location 360, interacting with the access management system app and communicating with an agent 312 via network 320. The agent 312 is communicating with second user 340 via a second computing device ("second device") 314 located at a call center 310 or other space remote relative to the second user 340.

For purposes of this example, the second user 340 has requested access to secured resources associated with a user account managed by the entity which agent 312 is representing. In this case, a first user interface ("first interface") 380 provides a first chat window 382 to allow the second user 340 to partake in an instant messaging session 384 with the second agent 312 ("Video Call with Service Representative/Connecting . . . Welcome! Your representative today is Sarah"). In other embodiments, the communication can occur in part or fully via a video conferencing interface whereby the agent 312 and second user 340 speak in real-time over a video screen.

Thus, a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

In different embodiments, once the second user 340 provides his consent, an image capturing event can be automatically triggered by the system or initiated by the agent 312, and image data 316 collected by an image sensor ("camera") 370. In some embodiments, the image capture event is scheduled to occur at a first time. Prior to or substantially synchronous to the transmission of the control signal causing the image capturing event at the first device 344, a different control signal is transmitted to the first device 344, causing the first device 344 to display a particular visual pattern on its screen, at a second time that coincides with the first time. One example of this process is illustrated in FIGS. 4 and 5.

Figure 4:
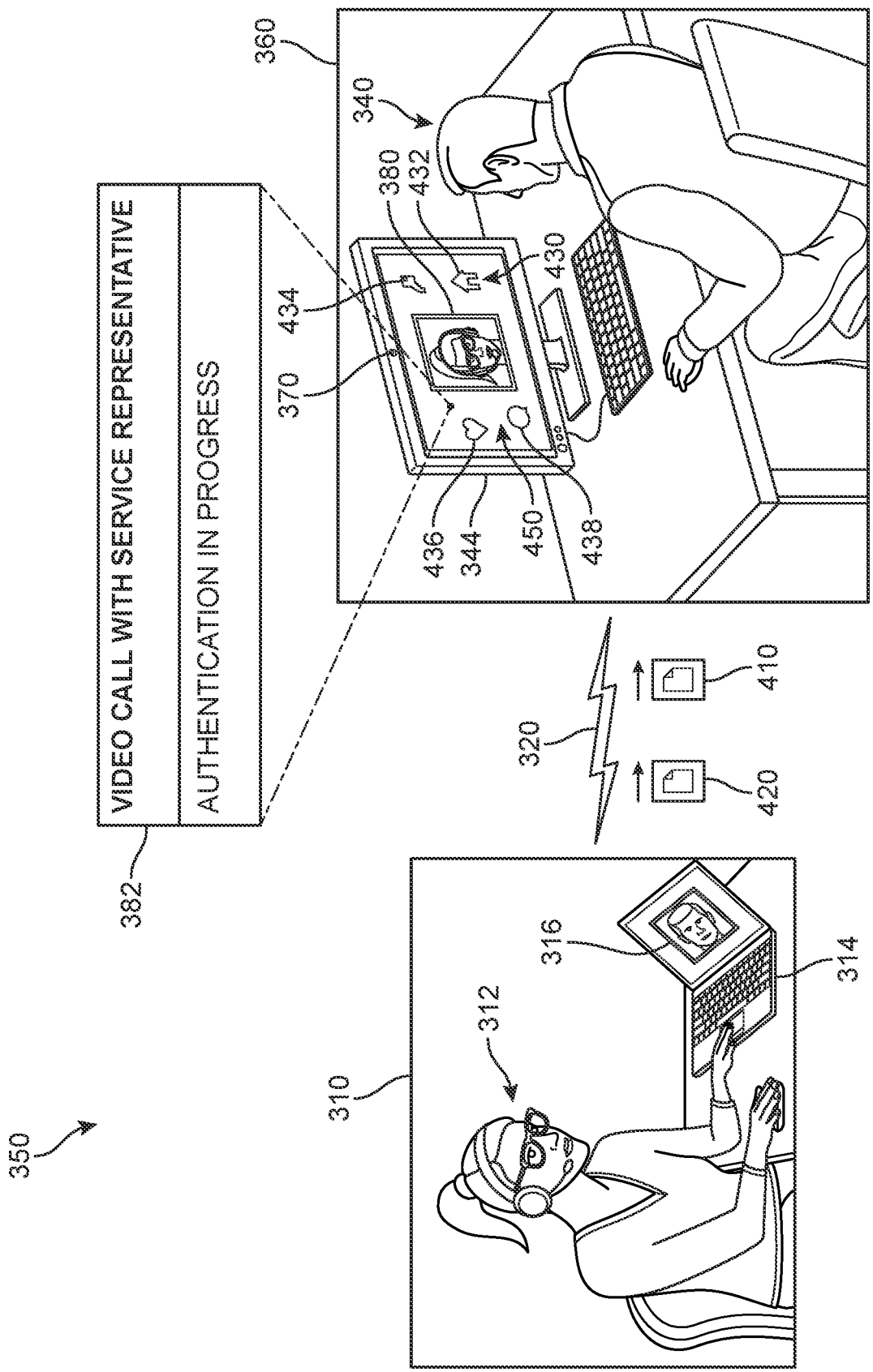

In FIG. 4, a first control signal 410 is generated and transmitted by the authentication system to the first device 344 directed toward producing a visual output 430 via a display 450 of first device 344. At or around the same time, a second control signal 420 is generated and transmitted by the authentication system to the first device 344 directed toward causing the camera 370 to capture images during the presentation of the visual output 430. While the two control signals are shown as two separate transmissions in FIG. 4, in other embodiments, a single control signal transmission can include both the two control signals in one transmission.

In this example, the visual output 430 that has been generated in response to the first control signal 410 includes a sequence of four visual icons that are flashed in sequence from a first icon 432, a second icon 434, a third icon 436, and a fourth icon 438. As each icon briefly appears on a screen 450 of first device 344, the gaze of the second user 340 will reflexively change to 'catch' or notice the new visual information. While visual output 430 is being displayed, the second user 340 is positioned in front of the field of view of camera 370 for the first device 344, ensuring that camera 370 is able to capture each change in expression as the sequence is shown. It should be understood that in other embodiments, the user may be instructed to follow the sequence of visual indicia with his/her eyes. Furthermore, in some embodiments, the visual pattern can comprise a single icon that moves across the screen while the user is instructed to follow the icon with their eyes.

Figure 5:
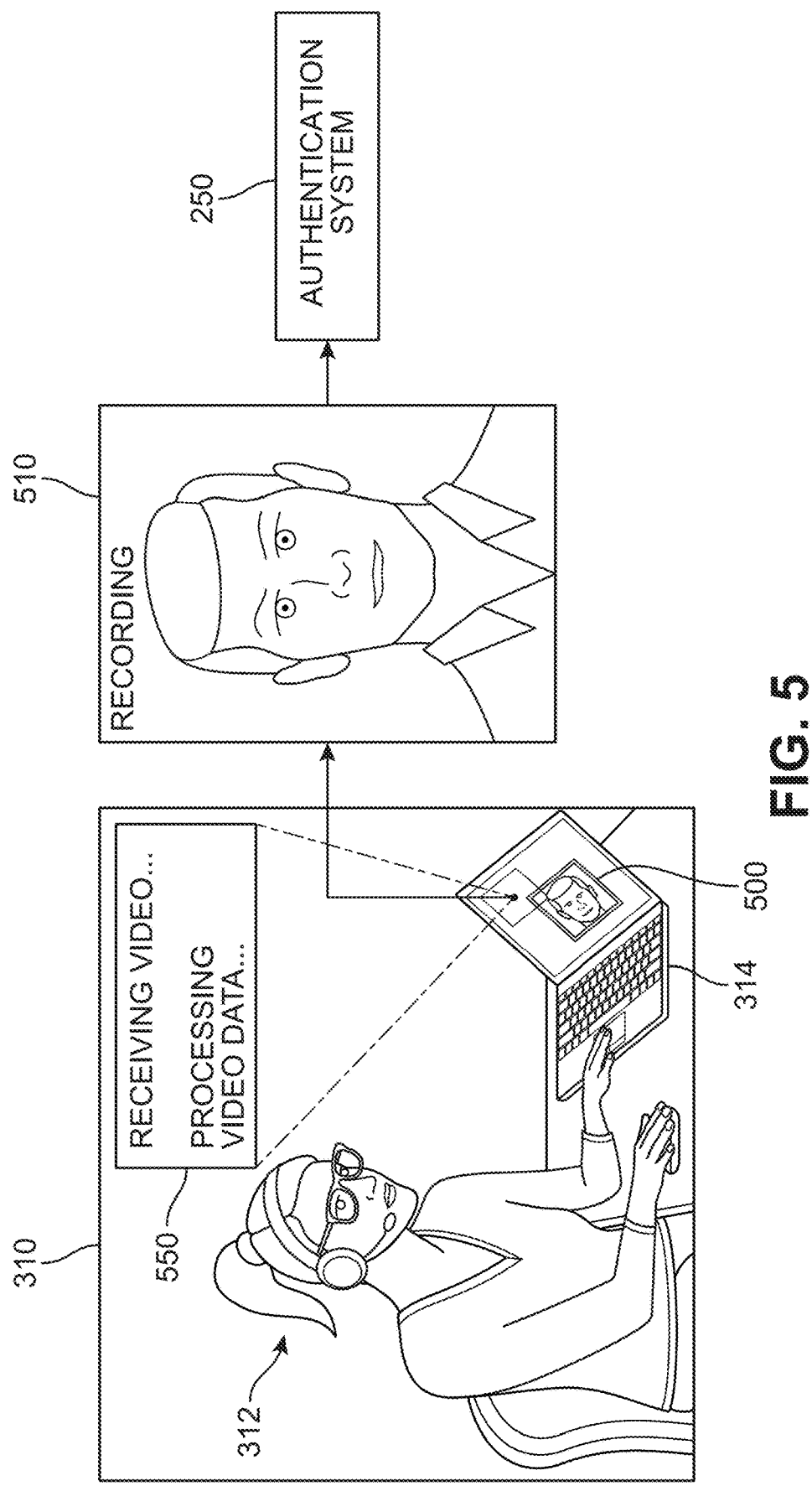
FIG. 5 depicts an example of initial image data captured by a camera of the user's device and being received by the authentication system, according to an embodiment.

Referring next to FIG. 5, a depiction of video 500 as received by the second device 314 is shown to the agent 312. In response to the second control signal, first image data 510 from video 500 is captured at a first time, in this case beginning just prior to the presentation of the visual output. The first image data 510 may be provided to authorization system 250 for processing, as indicated by a first status message 550 ("Receiving Video . . . Processing Video Data"). During the duration of the presentation of the visual output, the camera continues to capture video. The image data is processed in order to extract relevant features, as shown in the example of FIG. 6, where a set of features from a user input 610 has been extracted, comprising a first gaze direction 612, a second gaze direction 614, a third gaze direction 616, and a fourth gaze direction 618. It can be understood that each change in gaze, from first to second to third to fourth, is substantially in sync with the flash of icons on the screen (see FIG. 4). This response is identified, and will be compared to a reference reflexive response 650 to verify that the second user 340 responded to the visual output as expected. In this case, the response patterns have been determined to be similar enough so as to be classified as a match, as indicated by a second status message 620 ("Response verified. User authenticated. Please proceed with session") presented to the agent. The system can then automatically enable or grant the second user 340 access to the secured resource, or the agent can respond to the verification by manually enabling access.

In other embodiments, the example of FIGS. 3-6 can occur in the context of a first signal being an audio control signal, and a second signal as the microphone-capture control signal. Once the user provides a correct response to the system identifying the audio directionality sequence that is played, the system can automatically enable or grant the second user 340 to access the secured resource, or the agent can respond to the verification by manually enabling access. In some embodiments where greater security is desired, both visual and audio outputs may be generated, and the system can require the user provide both the reflexive response and their audio directionality response.

Figure 7:
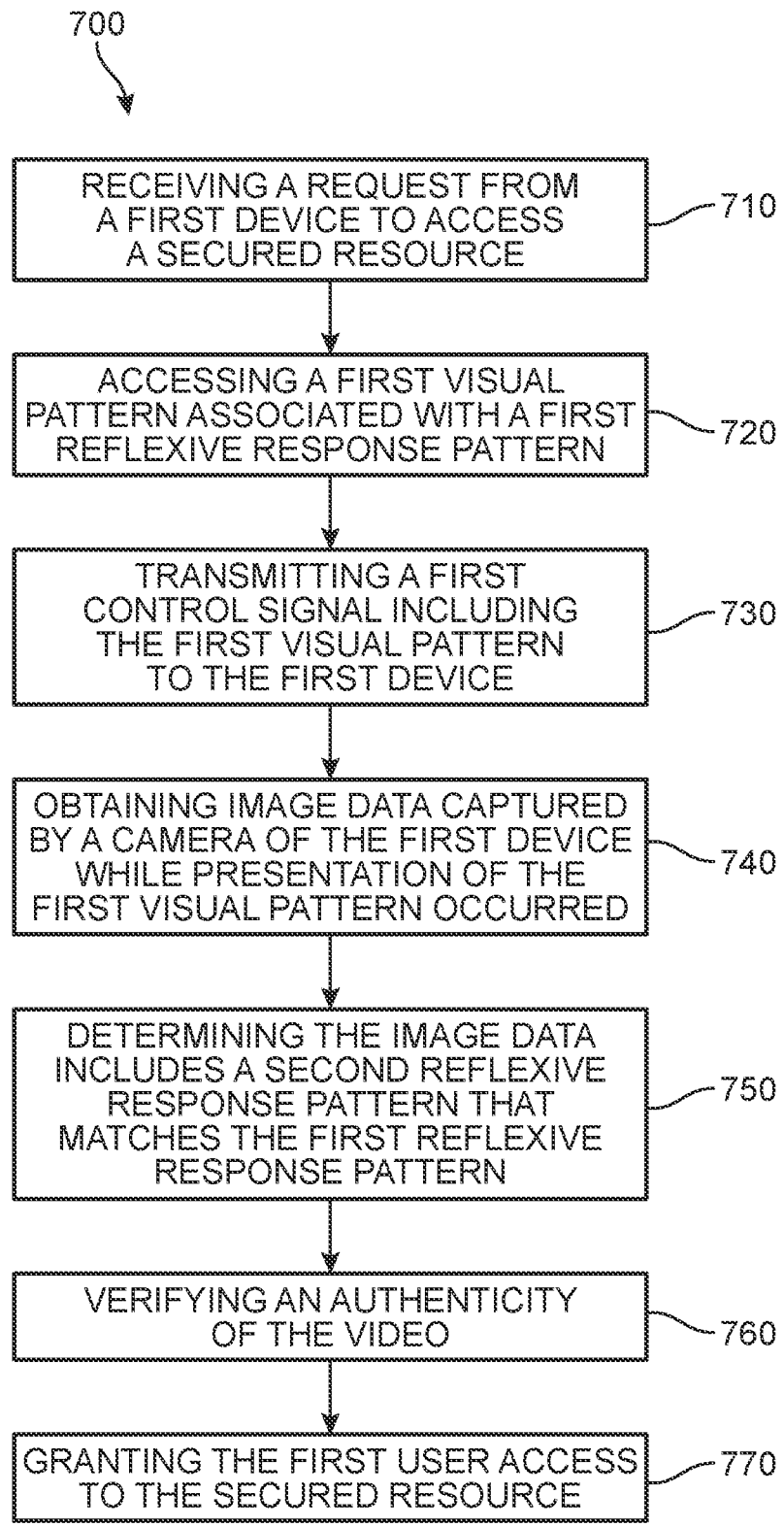
FIG. 7 is a flow chart depicting a process of verifying an authenticity of images in order to protect user resources, according to an embodiment.

FIG. 7 is a flow chart illustrating an embodiment of a method 700 of verifying an authenticity of images in order to protect user resources. The method 700 includes a first step 710 of receiving, at a cloud-based authentication system and from a first computing device, a request to access a secured resource of a first user. The method 700 also includes a second step 720 of accessing, in response to the request, a first visual pattern from a pattern repository of the authentication system, the first visual pattern being associated with a first reflexive response pattern that should be elicited on a person's face when the person views a rendering of the first visual pattern on a display. A third step 730 includes transmitting, from the authentication system and in response to the request, a first control signal to the first computing device, the first control signal including the first visual pattern. In addition, the method 700 includes a fourth step 740 of obtaining, at the authentication system, first image data captured by a camera of the first computing device while presentation of the first visual pattern via the first computing device was to have occurred, the first image data including a video recording of a face of a person. A fifth step 750 includes determining, at the authentication system, that the first image data includes a second reflexive response pattern that is sufficiently similar to the first reflexive response pattern so as to be classified as a match. In addition, a sixth step 760 includes verifying, in response to the two patterns matching, an authenticity of the video, and a seventh step 770 involves granting the first user access to the secured resource for which the first user is authorized.

In other embodiments, the method may include additional steps or aspects. In some embodiments, the method also includes a step of transmitting, from the authentication system and to the first computing device, a second control signal including instructions to capture image data while the visual pattern is displayed at the first computing device. In some embodiments, the method further includes steps of transmitting, from the authentication system and in response to the request, a second control signal to the first computing device, the second control signal including an audio pattern, obtaining, at the authentication system, a first response from the first user after playback of the audio pattern via the first computing device was to have occurred, the first response including a description of the directionality of the audio pattern, and determining, at the authentication system, that the first response is correct, where verifying the authenticity of the video is further based on the determination that the first response is correct. In some embodiments, the image data is captured during a real-time video streaming of the user with a service representative or other second user (i.e., the visual pattern is displayed during the video-based call), and the streaming video is authenticated based on the reflexive response.

In another embodiment, the visual pattern comprises one or more graphic icons that are presented at different locations on the display. In such cases, the one or more graphic icons can each presented for less than two seconds on the display. In some embodiments, the visual pattern comprises two or more graphic icons that are presented sequentially. In one example, playback of the audio pattern is from one of either a left or right speaker and the user is asked what the directionality characteristic of the audio was. In some embodiments, the secured resource includes one of a service, feature, and information for which access is restricted to one or more authorized persons. In another example, the first image data is obtained during a telephone or videoconferencing session between the first user and a service representative associated with the secured resource.

Other methods may be contemplated within the scope of the present disclosure. For example, in some embodiments, a method of detecting fraudulent attempts to obtain access to secure user data using image data is disclosed. The method includes a first step of receiving, at a cloud-based authentication system and from a first computing device, a request to access a secured resource of a first user, and a second step of accessing, in response to the request, a first visual pattern from a pattern repository of the authentication system, the first visual pattern being associated with a first reflexive response pattern that should be elicited on a person's face when the person views a rendering of the first visual pattern on a display. A third step includes transmitting, from the authentication system and in response to the request, a first control signal to the first computing device, the first control signal including the first visual pattern, and a fourth step includes obtaining, at the authentication system, first image data captured by a camera of the first computing device while presentation of the first visual pattern via the first computing device was to have occurred, the first image data including a video recording of a face of a person. In addition, a fifth step includes determining, at the authentication system, that the first image data fails to include a second reflexive response pattern that matches the first reflexive response pattern, a sixth step includes determining, in response to the first image data failing to include a matching pattern, that there is a high likelihood of the request originating from a fraudulent source, and a seventh step includes denying the request and blocking access to the secured resource (in response to the determination that there is a high likelihood of the request originating from a fraudulent source).

In such embodiments, the method may include additional steps or aspects. In some embodiments, the method also includes a step of transmitting, from the authentication system and to the first computing device, a second control signal including instructions to capture image data when the visual pattern is displayed at the first computing device. In one embodiment, the secured resource includes one of a service, feature, and information for which access is restricted to one or more authorized persons. In some embodiments, the first image data is obtained during a telephone or videoconferencing session between a user of the first computing device and a service representative associated with the secured resource. In one example, the first image data is at least partially generated using deep fake technology. In some embodiments, the method can also include steps of generating a message indicating an unauthorized attempt to access the secured resource may have occurred, and automatically transmitting the message to a communication channel (i.e., an email address, SMS, in-app chat, paper letter, pop-up window, etc.).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
   receiving, at a cloud-based authentication system and from a first computing device, a request to access a secured resource of a first user;
   accessing, in response to the request, a first visual pattern from a pattern repository of the authentication system, the first visual pattern being associated with a first reflexive response pattern that should be elicited on a person's face when the person views a rendering of the first visual pattern on a display;
   transmitting, from the authentication system and in response to the request, a first control signal and a second control signal to the first computing device, the first control signal including the first visual pattern and the second control signal including an audio pattern;
   obtaining, at the authentication system:
      first image data captured by a camera of the first computing device while presentation of the first visual pattern via the first computing device was to have occurred, the first image data including a video recording of a face of a person, and
      a first response from the first user after playback of the audio pattern via the first computing device was to have occurred, the first response including a description of the directionality of the audio pattern;
   determining, at the authentication system, that:
      the first image data includes a second reflexive response pattern that is sufficiently similar to the first reflexive response pattern so as to be classified as a match, and the first response is correct;
verifying, in response to the patterns matching and the first response being correct, an authenticity of the video; and
thereby granting the first user access to the secured resource for which the first user is authorized.

2. The method of claim 1, further comprising transmitting, from the authentication system and to the first computing device, a second control signal including instructions to capture image data while the first visual pattern is displayed at the first computing device.

3. The method of claim 1, further comprising:
receiving, at the authentication system and from a second computing device, a request to access the secured resource of the first user;
transmitting, from the authentication system and in response to the request, a second control signal to the second computing device, the second control signal including the first visual pattern;
obtaining, at the authentication system, second image data captured by a camera of the second computing device while presentation of the first visual pattern via the second computing device was to have occurred, the second image data including a video recording of a face of a person;
determining, at the authentication system, that the second image data fails to include the second reflexive response pattern;
determining, in response to the second image data failing to include the second reflexive response pattern, that there is a high likelihood of the request originating from a fraudulent source; and
denying the request and blocking access to the secured resource.

4. The method of claim 1, wherein the first visual pattern comprises one or more graphic icons that are presented at different locations on the display.

5. The method of claim 4, wherein the one or more graphic icons are each presented for 1-2 seconds on the display.

6. The method of claim 1, wherein the visual pattern comprises two or more graphic icons that are presented sequentially.

7. The method of claim 1, wherein playback of the audio pattern is from one of either a left or right speaker.

8. The method of claim 1, wherein the secured resource includes one of a service, feature, and information for which access is restricted to one or more authorized persons.

9. The method of claim 1, wherein the first image data is obtained during a telephone or videoconferencing session between the first user and a service representative associated with the secured resource.

10. The method of claim 1,
wherein the first image data is at least partially generated using deep fake technology.

11. A system for verifying an authenticity of images in order to protect user resources, the system comprising a processor and machine-readable media including instructions which, when executed by the processor, cause the processor to:
receive, at a cloud-based authentication system and from a first computing device, a request to access a secured resource of a first user;
access, in response to the request, a first visual pattern from a pattern repository of the authentication system, the first visual pattern being associated with a first reflexive response pattern that should be elicited on a person's face when the person views a rendering of the first visual pattern on a display;
transmit, from the authentication system and in response to the request, a first control signal and a second control signal to the first computing device, the first control signal including the first visual pattern and the second control signal including an audio pattern;
obtain, at the authentication system:
first image data captured by a camera of the first computing device while presentation of the first visual pattern via the first computing device was to have occurred, the first image data including a video recording of a face of a person, and
a first response from the first user after playback of the audio pattern via the first computing device was to have occurred, the first response including a description of the directionality of the audio pattern;
determining, at the authentication system, that:
the first image data includes a second reflexive response pattern that is sufficiently similar to the first reflexive response pattern so as to be classified as a match, and
the first response is correct;
verify, in response to the patterns matching and the first response being correct, an authenticity of the video; and
thereby grant first user access to the secured resource for which the first user is authorized.

12. The system of claim 11, wherein the instructions further cause the processor to transmit, from the authentication system and to the first computing device, a second control signal including instructions to capture image data while the first visual pattern is displayed at the first computing device.

13. The system of claim 11, wherein the first visual pattern comprises one or more graphic icons that are presented at different locations on the display.

14. The system of claim 11, wherein the visual pattern comprises two or more graphic icons that are presented sequentially.

15. The system of claim 11, wherein the one or more graphic icons are each presented for 1-2 seconds on the display.

16. The system of claim 11, wherein playback of the audio pattern is from one of either a left or right speaker.

17. The system of claim 11, wherein the secured resource includes one of a service, feature, and information for which access is restricted to one or more authorized persons.

18. The system of claim 11, wherein the first image data is obtained during a telephone or videoconferencing session between the first user and a service representative associated with the secured resource.

19. The system of claim 11, wherein the instructions further cause the processor to:
receive, at the authentication system and from a second computing device, a request to access the secured resource of the first user;
transmit, from the authentication system and in response to the request, a second control signal to the second computing device, the second control signal including the first visual pattern;
obtain, at the authentication system, second image data captured by a camera of the second computing device while presentation of the first visual pattern via the second computing device was to have occurred, the second image data including a video recording of a face of a person;

determine, at the authentication system, that the second image data fails to include the second reflexive response pattern;

determine, in response to the second image data failing to include the second reflexive response pattern, that there is a high likelihood of the request originating from a fraudulent source; and deny the request and block access to the secured resource.

20. The system of claim 19, wherein the first image data is at least partially generated using deep fake technology.

* * * * *